(12) United States Patent
Wiegner (10) Patent No.: US 7,307,516 B2
(45) Date of Patent: Dec. 11, 2007

(54) INSTRUMENT VIEWING DISPLAY SYSTEM FOR MOTORCYCLES

(76) Inventor: Thomas F. Wiegner, 36W548, St. Charles, IL (US) 60175

( * ) Notice: Subject to any disclaimer, the term of this patent is extended or adjusted under 35 U.S.C. 154(b) by 225 days.

(21) Appl. No.: 11/208,051

(22) Filed: Aug. 19, 2005

(65) Prior Publication Data

US 2006/0038666 A1 Feb. 23, 2006

Related U.S. Application Data

(60) Provisional application No. 60/650,731, filed on Feb. 7, 2005, provisional application No. 60/603,593, filed on Aug. 22, 2004.

(51) Int. Cl.
*B62J 3/00* (2006.01)
(52) U.S. Cl. ............................ 340/432; 340/427; 345/7
(58) Field of Classification Search ................ 340/432, 340/461, 459, 438, 425.5, 427; 345/7
See application file for complete search history.

(56) References Cited

U.S. PATENT DOCUMENTS

| | | | |
|---|---|---|---|
| 3,940,756 A | 2/1976 | Findlay | 340/324 |
| 4,039,890 A | 8/1977 | Bailey | 313/500 |
| D261,752 S | 11/1981 | Iwakura | D12/114 |
| D279,975 S | 8/1985 | Akira et al. | D12/192 |
| 4,687,072 A * | 8/1987 | Komuro | 180/219 |
| 4,862,395 A | 8/1989 | Fey | 364/561 |
| 4,874,228 A | 10/1989 | Aho | 380/345 |
| 5,008,658 A | 4/1991 | Russay | 340/784 |
| D318,255 S | 7/1991 | Maxwell | D12/192 |
| 5,091,833 A | 2/1992 | Paniaguas et al. | 362/191 |
| 5,453,855 A | 9/1995 | Nakamura | 359/49 |
| 5,578,985 A | 11/1996 | Cremers | 340/461 |
| 5,691,695 A * | 11/1997 | Lahiff | 340/461 |
| 5,695,269 A | 12/1997 | Lippmann | 362/27 |
| 5,714,929 A | 2/1998 | Liu | 340/441 |
| 5,732,098 A | 3/1998 | Nisitani | 372/45 |
| D412,139 S | 7/1999 | Hanlon et al. | D12/126 |
| 6,053,626 A * | 4/2000 | Zagrodnik et al. | 362/473 |
| 6,060,985 A * | 5/2000 | Siviero | 340/461 |
| 6,204,752 B1 | 3/2001 | Kishimoto | 340/432 |
| 6,407,663 B1 * | 6/2002 | Huggett | 340/461 |
| D461,437 S | 8/2002 | Hofmann et al. | D12/192 |
| D471,141 S | 3/2003 | Hofmann et al. | D12/192 |
| D485,633 S | 1/2004 | Krumholz | D26/47 |
| 6,717,376 B2 | 4/2004 | Lys | 315/292 |
| 6,789,921 B1 | 9/2004 | Deloy | 362/252 |
| 6,790,251 B1 | 9/2004 | Brady | 55/419 |
| 7,001,056 B2 | 2/2006 | Clegg | 362/571 |
| 7,025,474 B2 | 4/2006 | Campbell | 362/231 |
| 7,187,270 B2 | 3/2007 | Kushida | 340/438 |
| 2002/0167637 A1 | 11/2002 | Burke | 349/161 |
| 2005/0094391 A1 | 5/2005 | Campbell | 362/231 |
| 2006/0039129 A1 | 2/2006 | Coghlan | 362/23 |
| 2006/0232986 A1 | 10/2006 | Miyagaki | 362/459 |
| 2006/0238327 A1 | 10/2006 | Repetto | 340/461 |
| 2007/0078598 A1 | 4/2007 | Watanabe | 701/211 |

* cited by examiner

*Primary Examiner*—Phung T. Nguyen
(74) *Attorney, Agent, or Firm*—Lesavich High-Tech Law Group, P.C.; Stephen Lesavich

(57) ABSTRACT

An instrument viewing display system for motorcycles. The instrument viewing display system comprises one or more objects in which motorcycle display indicators for motorcycle systems (e.g., oil pressure, low fuel indicator, turn signals, high-beam, voltage indicator, neutral indicator, tachometer, speedometer etc.) are placed on a front, back, or in the objects. The display indicators are immediately viewable in a variety of weather and lighting conditions.

24 Claims, 10 Drawing Sheets

INSTRUMENT VIEWING DISPLAY SYSTEM FOR MOTORCYCLES

CROSS REFERENCES TO RELATED APPLICATIONS

The application claims priority to U.S. Provisional Patent Application Nos. 60/603,593, filed Aug. 22, 2004, and 60/650,731, filed Feb. 7, 2005, the contents of both of which are incorporated by reference.

FIELD OF THE INVENTION

This invention relates to motorcycles. More specifically, it relates to a motorcycle instrument viewing system.

BACKGROUND OF THE INVENTION

Motorcycles have display indicators for many different types of systems on the motorcycle. The displays include gauges, lights and other types of displays.

However, there are several problems associated with viewing such different systems on a motorcycle. One problem is that motorcycles are ridden in a many diverse weather and lighting conditions including bright sunlight, darkness, overcast, twilight, dusk and rainy conditions. Such weather and lighting conditions make it difficult to view display indicators.

Another problem is that when a rider of a motorcycle desires to view a display indicator on a motorcycle, the rider has to temporarily take his/her eyes off the road to view a display indicator.

Another problem is that the display indicators on a motorcycle are spread across a front end of a motorcycle. This makes it difficult to view a desired display indicator quickly.

Another problem is that many motorcycle riders like to customize their bikes with personal objects. Such personal objects often interfere with viewing of display indicators.

There have been attempts to solve some of the problems associated with viewing display indicators on motorcycles. For example, U.S. Pat. No. 6,060,985, entitled "Motorcycle instrument panel easily positioned on the vehicle" that issued to Siviero teaches A motorcycle instrument panel comprises a plurality of displays (4-15) for enabling the driver to check, for example, his speed (4), the activation state of one or more vehicle services such as lighting devices (8), direction indicators (9) and the like, and values relating to engine operation, such as its r.p.m., or its contained liquids, such as their temperature and level, said displays being connected to measurement and processing means (21) for the quantities to be displayed. The instrument panel comprises flexible circuit means enabling at least a part of the displays present on said instrument panel to be activated and operated.

U.S. Pat. No. D471,141, entitled "Portion of a motorcycle instrument cover" that issued to Hofmann, et al. teaches an ornamental design for a portion of a motorcycle instrument cover, as shown and described.

U.S. Pat. No. D461,437, entitled "Motorcycle instrument cover" that issued to Hofmann et al., teaches an ornamental design for a motorcycle instrument cover, as shown and described.

U.S. Pat. No. D412,139, entitled "Motorcycle instrument frame" that issued to Hanlon, et al. teaches an ornamental design for a motorcycle instrument frame, as shown and described.

U.S. Pat. No. D318,255, entitled "Motorcycle instrument housing" that issued to Maxwell, teaches an ornamental design for a motorcycle instrument housing, as shown and described.

U.S. Pat. No. D279,975, entitled "Motorcycle instrument cluster" that issued to Akira, et al., teaches the ornamental design for a motorcycle instrument cluster, as shown and described.

U.S. Pat. No. D261,752, entitled "Motorcycle instrument cluster" that issued to Iwakura teaches an ornamental design for a motorcycle instrument cluster, as shown.

There have also been attempts to illuminate personal objects such as Halloween objects such as pumpkins and skulls. For example, U.S. Pat. No. 5,091,833, entitled "Illuminated face elements and kit for making an illuminated face on pumpkins and the like" that issued to Paniaguas, et al., teaches a kit for creating a face on a head-like base such as a pumpkin to create a jack-o-lantern or the like. The kit includes a plurality of illuminating units, each of which has a battery and light bulb, and a plurality of largely translucent facial elements such as an eye, mouth, ear, etc. The facial elements are screwed into the illuminating unit to envelop and surround the light bulb so that light from the bulb's light is transmitted through the facial elements and emitted from the external surfaces of those elements. The assembly is configured so that the battery is housed in a spear-like pointed base which may be pushed into the head-like base and the light-emitting facial element thereby affixed to the outer surface of the head-like base. Other non-illuminated facial elements may supplement the illuminated ones. The translucent facial elements are interchangeable on the illuminating units so that the same unit can use different elements and the user can have different choices of elements. The translucent elements and base when assembled together enclose the electrical elements in a waterproof manner. The translucent elements have their outer surfaces coated with a light-reflecting coating so that light is emitted only on desired uncoated surface areas.

U.S. Pat. No. D485,633, entitled "Electrified skull with three-way switch for battery-powered flashing eyes and full on/off LED lighting" that issued to Krumholz teaches an ornamental design for an electrified skull with three-way switch for battery-powered flashing eyes and full on/off LED lighting, as shown and described.

However, these inventions still do not solve all of the problems associated with display indicators on motorcycles. It is desirable to provide a viewing system for motorcycles that allows easy viewing of display indicators on motorcycles.

SUMMARY OF THE INVENTION

In accordance with preferred embodiments of the present invention, some of the problems associated viewing display indicators on motorcycles are overcome. An instrument viewing display system for motorcycles is presented.

The instrument viewing display system comprises one or more objects in which motorcycle display indicators for motorcycle systems (e.g., oil pressure, turn signals, high-beam, voltage indicator, low fuel indicator, neutral indicator, etc.) are placed on or in of an object (e.g., an ornamental object) mounted to a motorcycle. The display indicators are immediately viewable in a variety of weather and lighting conditions.

The foregoing and other features and advantages of preferred embodiments of the present invention will be more readily apparent from the following detailed description.

The detailed description proceeds with references to the accompanying drawings.

BRIEF DESCRIPTION OF THE DRAWINGS

Preferred embodiments of the present invention are described with reference to the following drawings, wherein.

DETAILED DESCRIPTION OF THE INVENTION

Exemplary Motorcycle Display Viewing System

Figure 1:
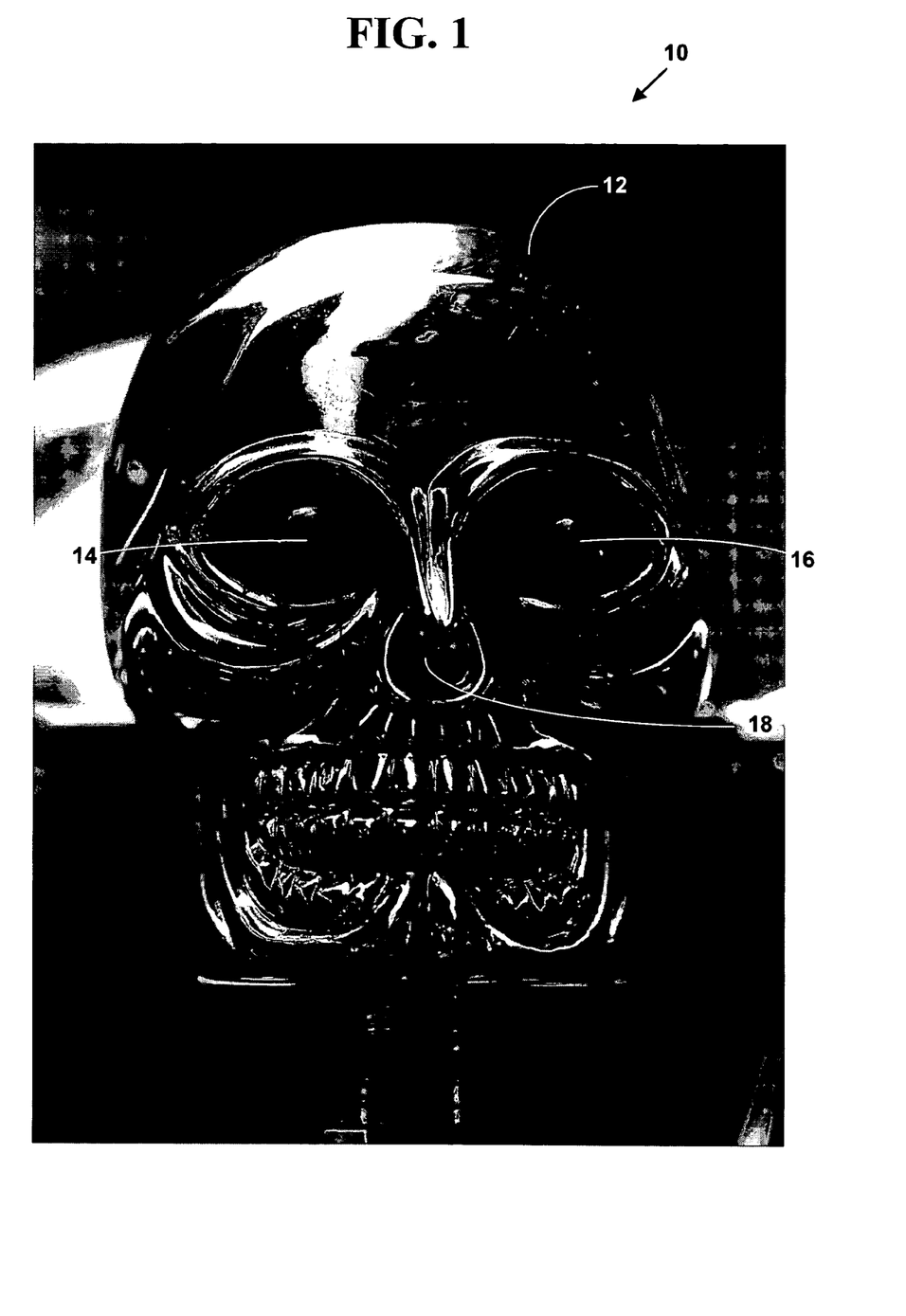
FIG. 1 is a block diagram illustrating a component of a motorcycle display viewing system.

FIG. 1 is a block diagram 10 illustrating a component 12 of a motorcycle display viewing system. The component 12 includes plural openings 14, 16, 18 in which a light emitting diode (LED) of a pre-determined color is placed as a display indicator of a motorcycle system (e.g., oil system, fuel system, power system, electrical system, safety system (e.g., turn signals, lights, etc.) etc.).

In one embodiment of the invention, component 12 is a single, cast metal chrome-plated skull head. However, component 12 can also comprise metal, plastic, composite materials, wood or other durable materials used for motorcycle parts. In such an embodiment, the plural openings 14, 16, 18 include plural facial features of the skull head including openings for two eyes 14 and 16 and a nose hole 18. However, the present invention is not limited to these facial features and other facial features (e.g., mouth, teeth, ear, head openings, etc.) can also be used to practice the invention. In addition, the present invention is not limited to s skull head and other objects and other shapes can be used to practice the invention.

The plural openings include a green-colored LED 14 for a neutral indication for a transmission, a red-colored LED 16 for high or low oil pressure or level indication, and a blue-colored LED for a high beam 18 indication. However, the present invention is not limited to such an embodiment and other types of objects (e.g., a pig head, a wolf head, an eagle head, a human head, an animal head, a cartoon or fictional character head or other human or animal body part, etc.) with more or fewer openings, other LED colors and other motorcycle systems can also be used to practice the invention.

Figure 2:
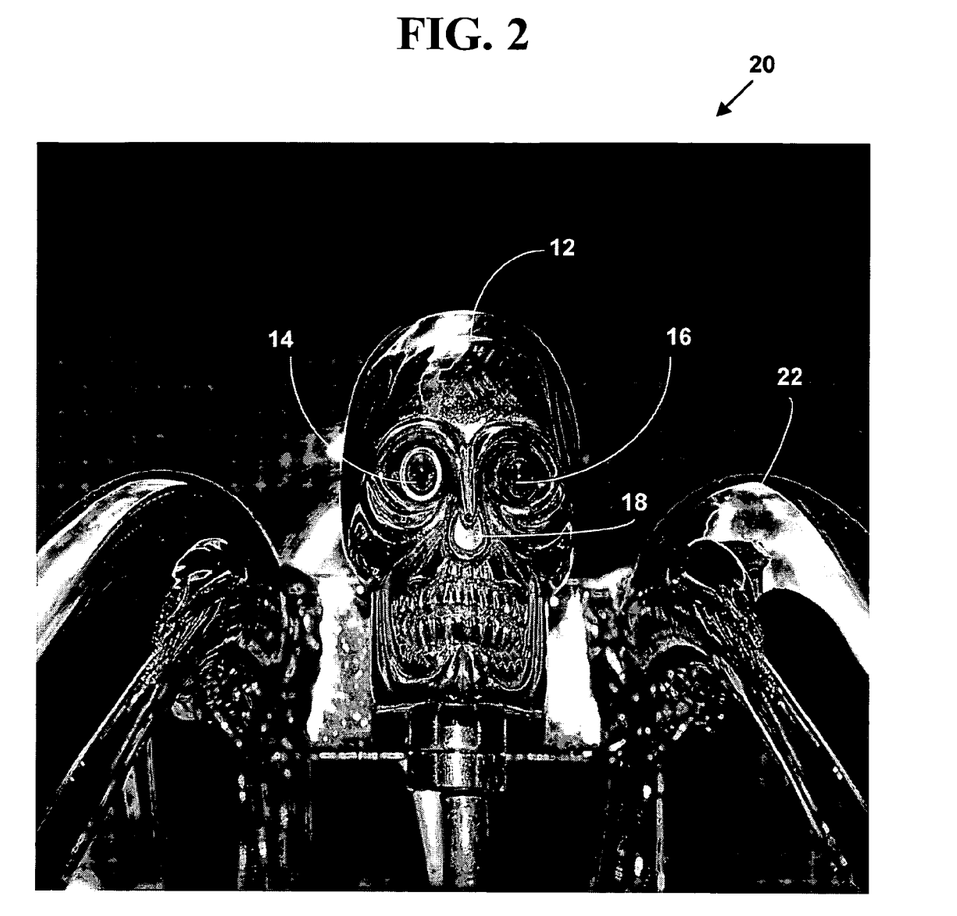
FIG. 2 is a block diagram illustrating the component of FIG. 1 mounted on a motorcycle.

FIG. 2 is a block diagram 20 illustrating the component 12 of FIG. 1 mounted on a motorcycle handlebar 22.

The component 12 allows display indicators 14, 16, 18 to able to be seen in daylight and bright sunlight while allowing a rider to keep his/her eyes on the road for safety. The display indicators 14, 16, 18 are also placed within the component an angle appropriate for viewing by a rider of the motorcycle in a variety of weather conditions including bright sunlight (e.g., at an angle of 10-80 degrees).

Figure 3:
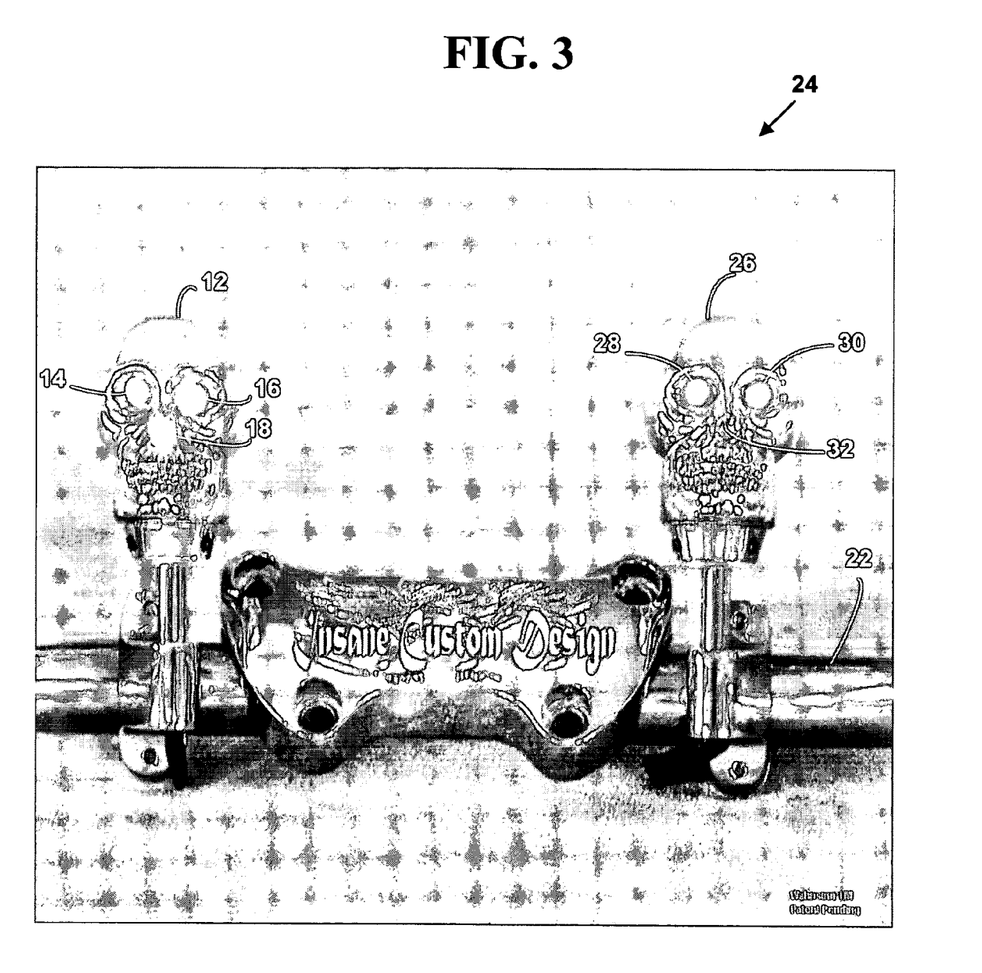
FIG. 3 is a block diagram illustrating plural components of a motorcycle display viewing system.

FIG. 3 is a block diagram 24 plural exemplary components 12, 26 of a motorcycle display viewing system. The plural components 12, 26 include plural openings 14, 16, 18 and 28, 30, 32 in which different color LEDs are placed. The plural components 12, 26 are mounted to a motorcycle handlebar 22.

Figure 4:
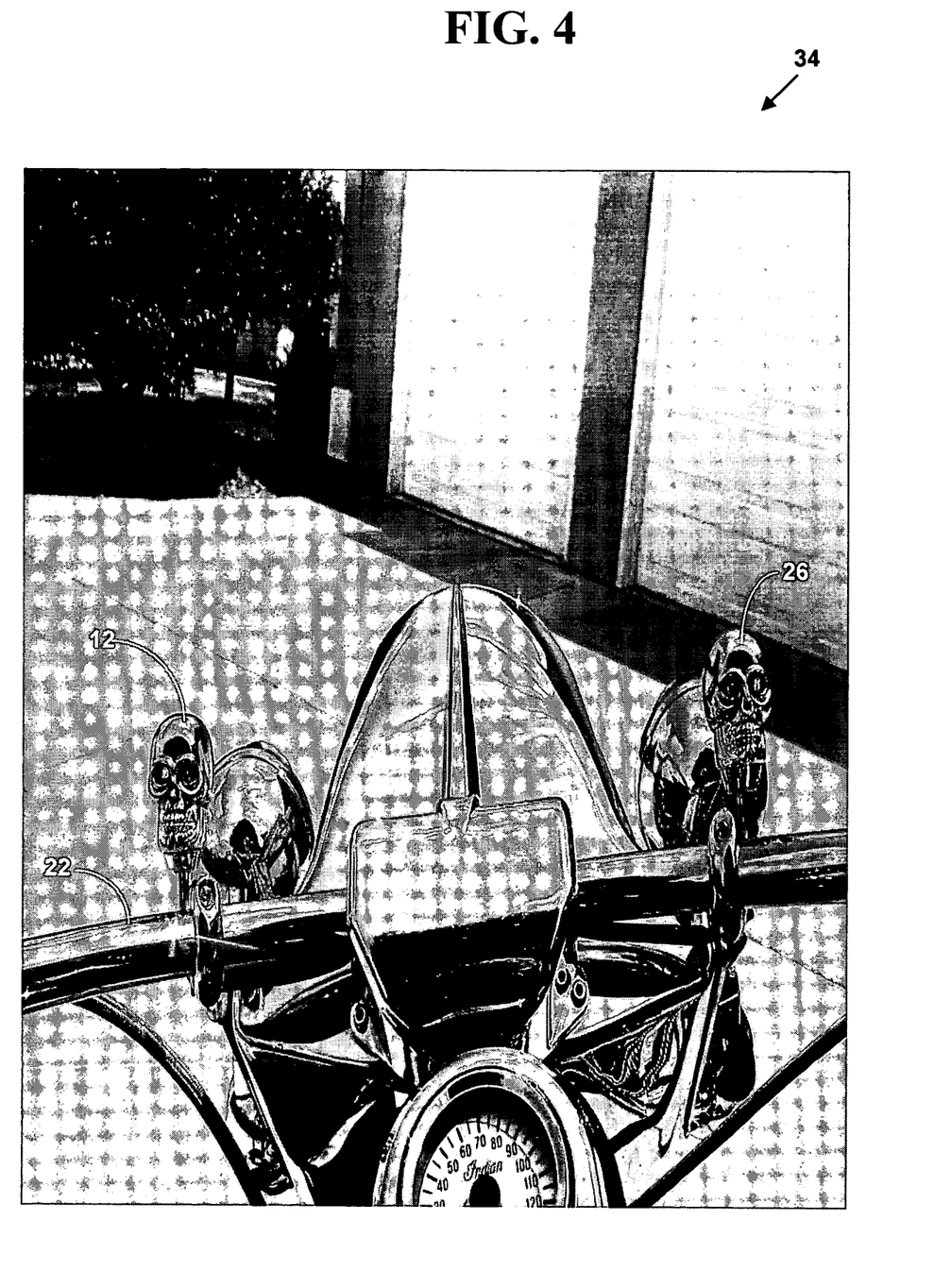
FIG. 4 is a block diagram illustrating plural components of a motorcycle display viewing system.

FIG. 4 is a block diagram illustrating plural components of a motorcycle display viewing system 34 mounted to a motorcycle handlebar 22.

In one embodiment, openings 14 and 30 include orange colored LEDS for left and right turn signal indicators respectively. Opening 16 includes a red colored LED for a high or low oil pressure or low oil level indication. Opening 28 includes a green colored LED for a neutral indicator for a transmission. Opening 18 includes a blue colored LED for a high-beam indicator. Opening 32 includes a yellow colored LED for a low fuel level or voltage charging system indicator (not illuminated in FIG. 3). However, the present invention is not limited to this embodiment and more, fewer or other LED colors and other motorcycle systems can also be used to practice the invention.

The LEDs are wired directly to an existing electrical harness powering existing controls. The LEDs allow an indication of the corresponding display system to be viewed in many different types of weather conditions including bright sunlight.

Unlike regular dash mounted incandescent controls the LEDs last for hundreds of thousands of hours and are not sensitive to vibrations of the motorcycle. Although the emitted light LED is extremely bright there is only minimal draw on the motorcycles electrical system (e.g., approximately 50 mA).

In one embodiment, the LEDs are high-intensity LED's. In another embodiment, the LED's are normal intensity LED's.

The components 12, 26 also allow a rider to customize his/her own motorcycle with a component shape of his/her own preference while taking advantage of the features of the invention (e.g., with a skull head, etc.).

However, the present invention is not limited to such an embodiment and other types of objects (e.g., a pig head, a wolf head, an eagle head, a human head, an animal head, a cartoon or fictional character head or other human, animal or fictional character body part, etc.), more objects with more or fewer openings, other LED colors and indications of other motorcycle systems can also be used to practice the invention.

In another embodiment of the invention, the information components (e.g., the LEDs in the facial features of the skulls or other ornamental designs, etc.) as illustrated in FIGS. 1-4 are rotated so that the information components are on the back of one or more ornamental objects. In another embodiment, the information components are located on both the front and back of the component 12.

Figure 5:
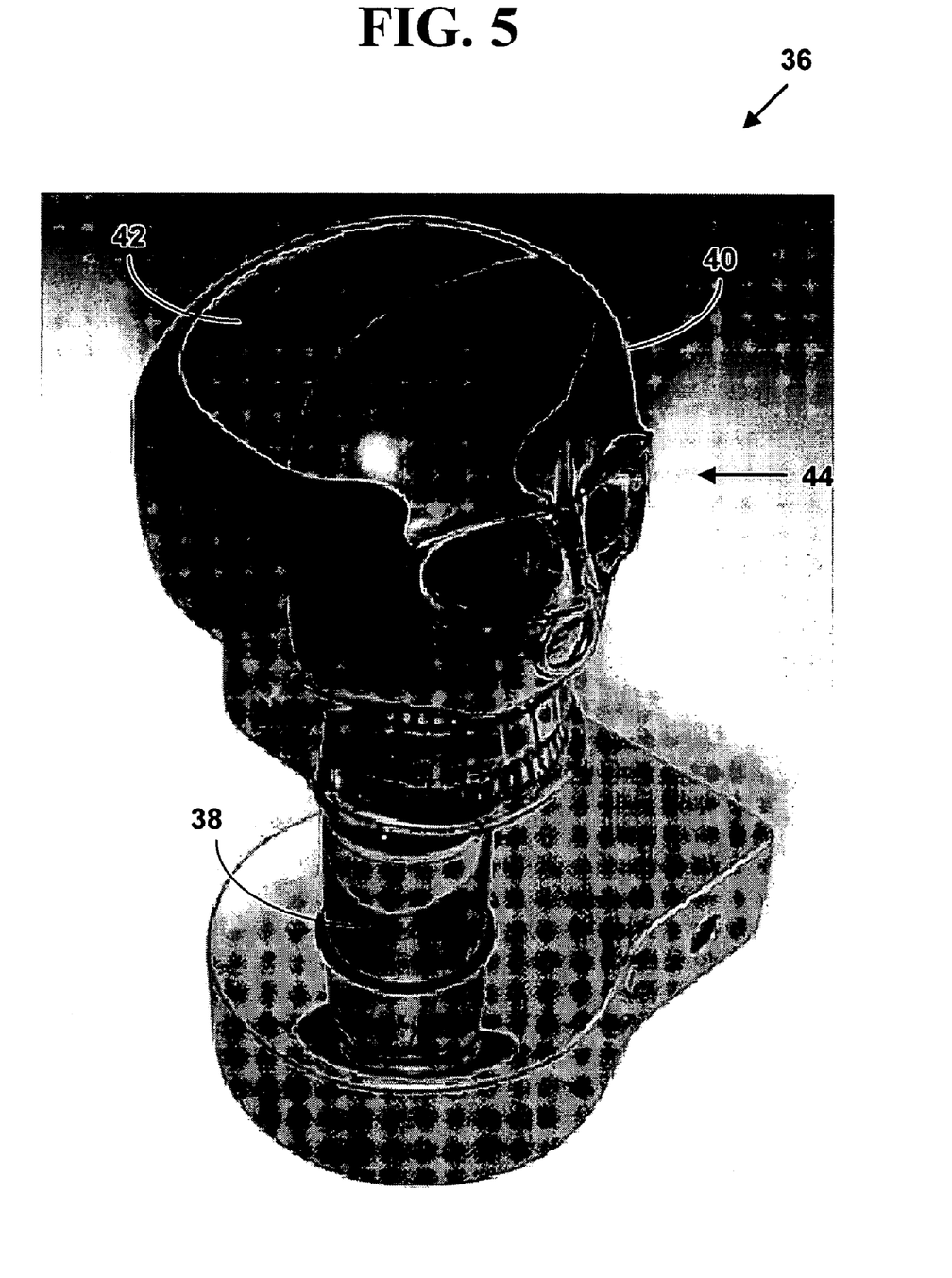
FIG. 5 is a block diagram illustrating a front view of another motorcycle display viewing system.

FIG. 5 is a block diagram illustrating a front view of another motorcycle display viewing system 36. The motorcycle display viewing system 36 includes a center section 38 portion, a front face portion 40 and a back face portion 42.

The center section portion 38 comprises metal, plastic, composite materials, wood or other durable materials used for motorcycle parts. In one embodiment the center section 38 is cast metal with a hollow center section and includes a plastic front face 40 and a back face 42 with plural openings for indicator lights. However, the invention is not limited to this embodiment and a center section of other materials that are cast, formed, carved formed by various other processes and techniques, and with different types of front faces and back faces can also be used to practice the invention.

The center section portion 38 is attached to front face portion 40 that is made of translucent plastic, that appears translucent when backlit and opaque when not backlit. The front face portion 40 also includes detailed aesthetic design features (e.g., the features of a human skull, features of a human body, features of a real or imaginary animal or character, etc.). However the present invention is not limited to this embodiment and other embodiment may also be used to practice the invention. For example, the front face portion 40 includes the same materials as the center portion and includes indicator lights in design features as was described above.

The center section portion 38 is also attached to a back face portion 42 with plural openings including various indicators for various motorcycle systems. The indicators include various colors used in the motorcycle industry (e.g., blue for high beam on, green for neutral transmission indication, etc.) and custom colors that are not typically used in the motorcycle industry.

In one embodiment, the indicators includes internal electronics and specialized high-intensity LED's are inserted from the front and sealed in by mounting the front face portion 40 onto the center section portion 38. An opening on the bottom of the center section portion 38 is used for wiring and mounting. In another embodiment, the indicators do not include internal electronics or specialized high-intensity LEDs, but instead include non-specialized and/or low intensity LEDs. However, the present invention is not limited to these embodiments and other types of indicators can also be used to practice the invention.

In one embodiment, specialized LED's used are printed on a circuit board. The LED's are powered and controlled by a computer chip or processor providing an automatic dimming feature for the LEDs when external lighting becomes dark (i.e., at night) eliminating the concern that a motorcycle rider may be temporarily blinded by the indicators on the motorcycle display system when first viewed at night.

In one embodiment, the front face portion 40 that is used a portion of a turn signal indicator that is translucent 48 orange in color. When the turn signal indicator is not in use the front face portion 40 is opaque 44 orange in color as illustrated in FIG. 5. However, the present invention is not limited to such an embodiment and the front face portion 40 can be used to indicate other systems.

Figure 6:
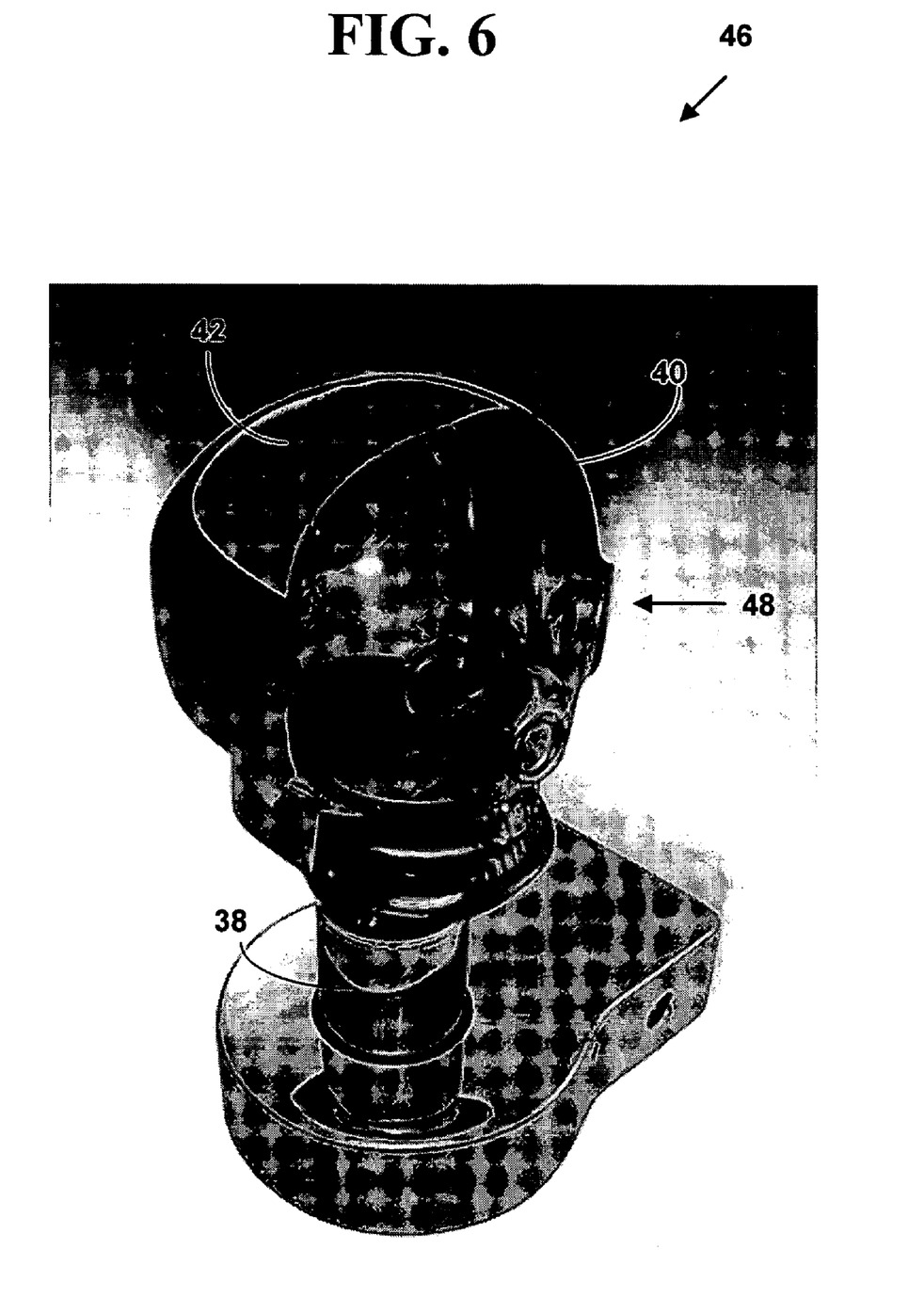
FIG. 6 is a block diagram illustrating a second front view of a motorcycle viewing display system.

FIG. 6 is a block diagram illustrating a second front view of a motorcycle viewing display system 46. When the turn indicator is in use, the front face portion 40 is translucent 48 orange in color as is illustrated in FIG. 6 and blinks on and off as the corresponding turn signal blinks on and off. The front face portion 40 is translucent 48 and is illuminated by an arrangement of high intensity LEDs that shine through the front face portion 40 from behind via the center section portion 38.

Figure 7:
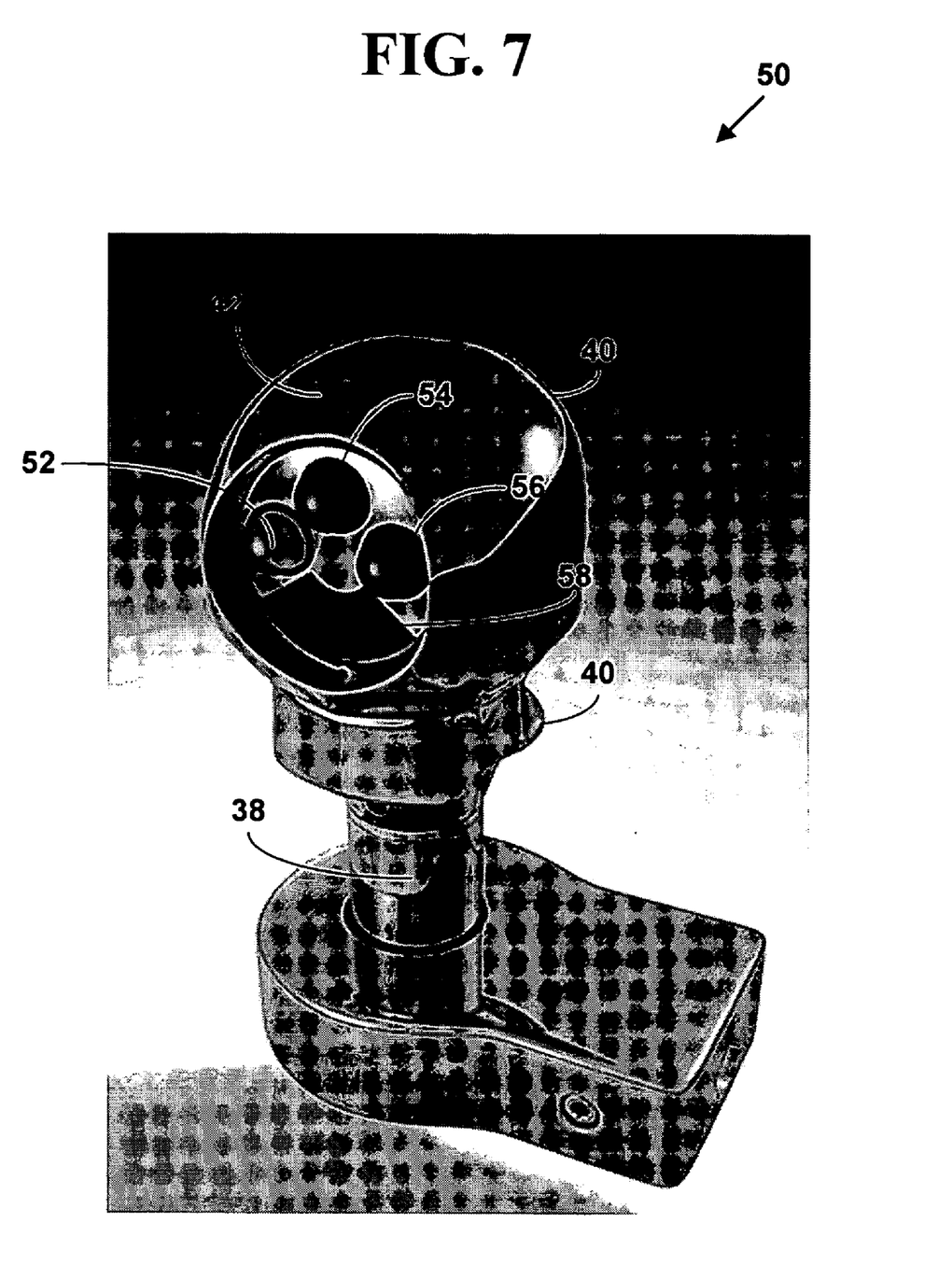
FIG. 7 is a block diagram illustrating a first back view of a motorcycle viewing display system.

FIG. 7 is a block diagram illustrating a first back view of a motorcycle viewing display system 50. The first back view 50 includes a first indicator 52 that is orange in color that is a turn signal indicator. This turn signal indicator blinks on and off in unison with the front face portion 40 as the front face portion changes from opaque 44 in the off position to translucent 48 in the on position. The first back view 50 further includes a second indicator 54 that is blue in color that represents when it is on that a headlight on the motorcycle is on high-beam and when it is off that the headlight is not on high-beam. The first back view 50 further includes a third indicator 56 that is red in color that represents when it is on that the motorcycle has a low oil level or low oil pressure or a high oil pressure and when it is off that the motorcycle has a normal oil level or normal oil pressure. Finally the first back view 50 includes a fourth indicator 58 that includes a display for displaying tachometer information (e.g., 12.5 rpms as illustrated in FIG. 7) and/or speedometer information and/or odometer information in a numeric format. The fourth indicator 58 is backlit for easy viewing. However, the present invention is not limited to this embodiment and more, fewer or other LED colors and other motorcycle systems can also be used to practice the invention.

In one embodiment, selected LEDs are dual-color LEDs that display a first color for a first indication or a motorcycle system and another different blinking color for a second indication for a motorcycle system. For example, the third indicator 56 may be red for a normal voltage charging or electrical system indication and a blinking purple color for a voltage charging or electrical system problem.

Figure 8:
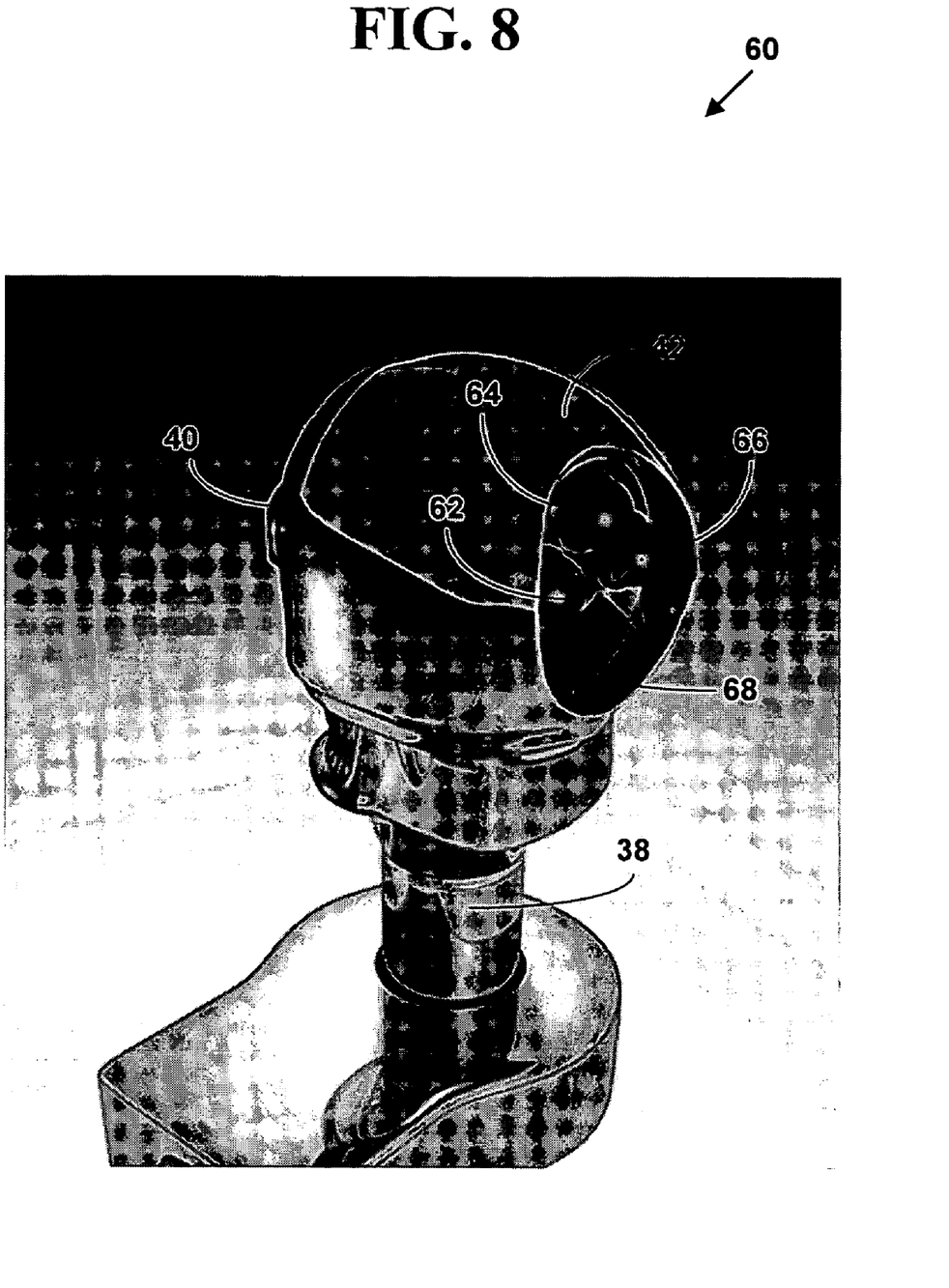
FIG. 8 is a block diagram illustrating a second back view of a motorcycle viewing display system.

FIG. 8 is a block diagram illustrating a second back view of a motorcycle viewing display system 60. The second back view 60 further includes a first indicator 62 that is a multi-color charging system indicator display via a single LED that will show for example a purple color to indicate that the charging system is working properly and a blinking red color indicating a voltage, charging or electrical system malfunction. However, the present invention is not limited to this embodiment, and other single LEDs in either first back view 50 and second back view 60 can also switch between a solid color for a normal or abnormal indication and another different blinking color for a another normal or abnormal indication for a motorcycle system.

The second back view 60 further includes a second indicator 64 that is green in color that represents when it is on that a transmission on the motorcycle is in a neutral position and when it is off that the transmission is not in the neutral position. The second back view 60 further includes a third indicator 66 that is orange in color that is another turn signal indicator. This turn signal indicator blinks on and off in unison with the front face 40 as the front face changes from opaque 44 in the off position to translucent 48 in the on position. Finally the second back view 60 includes a fourth indicator 68 that includes a display for displaying speedometer information (e.g. 68.5 mph as illustrated in FIG. 8) and/or odometer information and/or tachometer in a numeric format. The fourth indicator 68 is also backlit for easy viewing. However, the present invention is not limited to this embodiment and more, fewer or other LED colors and other motorcycle systems can also be used to practice the invention.

A motorcycle typically would include a motorcycle display system with the first back view 50 on one side of the motorcycle handlebars (e.g., the left side) and a motorcycle display system and include only a tachometer 58 as the fourth indicator with the second back view 60 on another side of the motorcycle display system handlebars (e.g., the right side) with the fourth indicator including only a speedometer and/or an odometer. This left and right side configuration is similar to that illustrated in FIG. 4. However, FIG.

4 the facial features of the two skulls of the motorcycle display system face the rider while in FIGS. 5-8 the facial features of the skull face away from the rider. Both of the motorcycle display system components with the first back view 50 and the second back view 60 would have the same front face portion 40 that would change from opaque to translucent as it corresponding turn signal indicator turned on and off indicating an intention to make a right-hand or left-hand turn.

Figure 9:
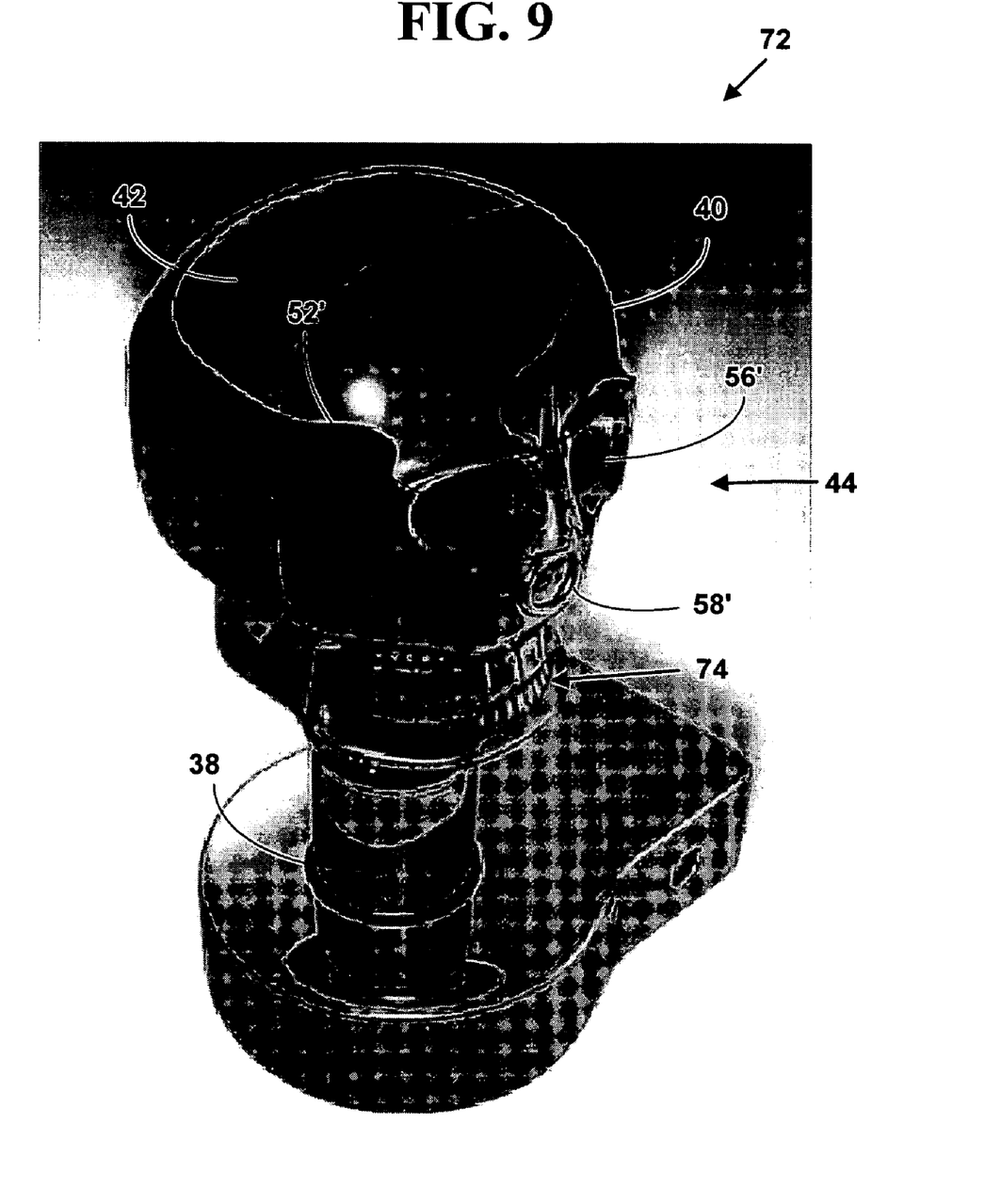
FIG. 9 is a block diagram illustrating another front view of a motorcycle display system.

FIG. 9 is a block diagram illustrating another front view 72 of a motorcycle display system. In such an embodiment, the second indicator 54 (i.e., blue LED to a skull eye, etc.) would shine through to a second design feature 54' the front face portion 40 from the back face portion 42. The third indicator 56 (i.e., red LED to a skull eye, etc.) would shine through to a third design feature 56' and the fourth indicator 58 would shine through to a fourth design feature 58' (e.g., tachometer to skull teeth, etc.). Indicators 62, 66 and 70 (FIG. 8) shine through in a similar manner.

In one embodiment, the odometer, speedometer and/or tachometer do not shine through from the back face portion 42 to the front face portion 40. In another embodiment the odometer, speedometer and/or tachometer do shine through from the back portion 42 to the front portion 40 to a selected portion 74 (e.g., the teeth of the skull, the forehead of the skull etc.) of the front portion 40.

In FIG. 9, the various indicators shining through from the back face portion 42 to the front face portion 40 add additional and interesting ornamental features to the motorcycle display system when viewed by others. For example, the indicators 52, 56 and 58 could shine through when the front face 40 is opaque 44 adding additional light to the front face portion 40 and be dimmed or turned off when the front face portion 40 changes to translucent 48. However, the present invention is not limited to this embodiment and the various indicators need not shine through the front face portion 40 from the back face portion 42 to practice the invention.

The indicator features are housed in the same center section portion 38 whose primary objective is to take on the function as a marker light in the front (or rear) as described herein. The motorcycle display systems described here can be used to replace existing turn signal indicators and display devices on a motorcycle and/or be used in addition to existing turn signal indicators or display devices or other existing indicator components on a motorcycle.

A pre-determined priority order is used to display an indicator color of higher importance first. For example, a low oil pressure indicator, low fuel indicator, or voltage irregularity indicator are higher in priority than a turn signal indicator and would be displayed.

In such an embodiment, the front portion 40 is used as a turn signal indicator and is used to display a color of a selected motorcycle system based on a pre-determined priority scheme. The front portion 40 displays a color of a selected motorcycle system when the turn signal is not activated, displays a color of the turn signal indicator when activated and then returns to displaying the color of the selected motorcycle system when the turn signal is deactivated.

In another embodiment, the front face portion 40 includes a clear color plastic. In such an embodiment, the front face portion 40 takes on a color of any desired indicator and not just a turn signal indicator. For example, if a high beam was turned on, the front face portion 40 would turn from a clear opaque 44 to translucent 48 blue color. If a rider then activated the turn signal indicator, then the front face portion 40 would turn from translucent 48 blue in color to translucent 48 orange in color for the duration of the turn and then back to blue in color after the turn was completed. Other colors, changes of color and pre-determined priority orders can also be used to practice the invention.

In one embodiment, the motorcycle display system is designed to use both stock original and after market mounting hardware to position the motorcycle display system virtually anywhere on the motorcycle (e.g., triple tree, fork tubes, handlebars, existing mounting rods etc.)

In another embodiment, the display system can be used on other vehicles such as cars, trucks, etc. The features of the indicator lights and the tachometer and speedometer/odometer may or may not be necessary with other vehicles. However, display systems within ornamental designs that have indicator lights can also be used on vehicle components such as transmission stick shifts, rear or side view mirrors, display lights, a heads-up display, etc.

Figure 10:
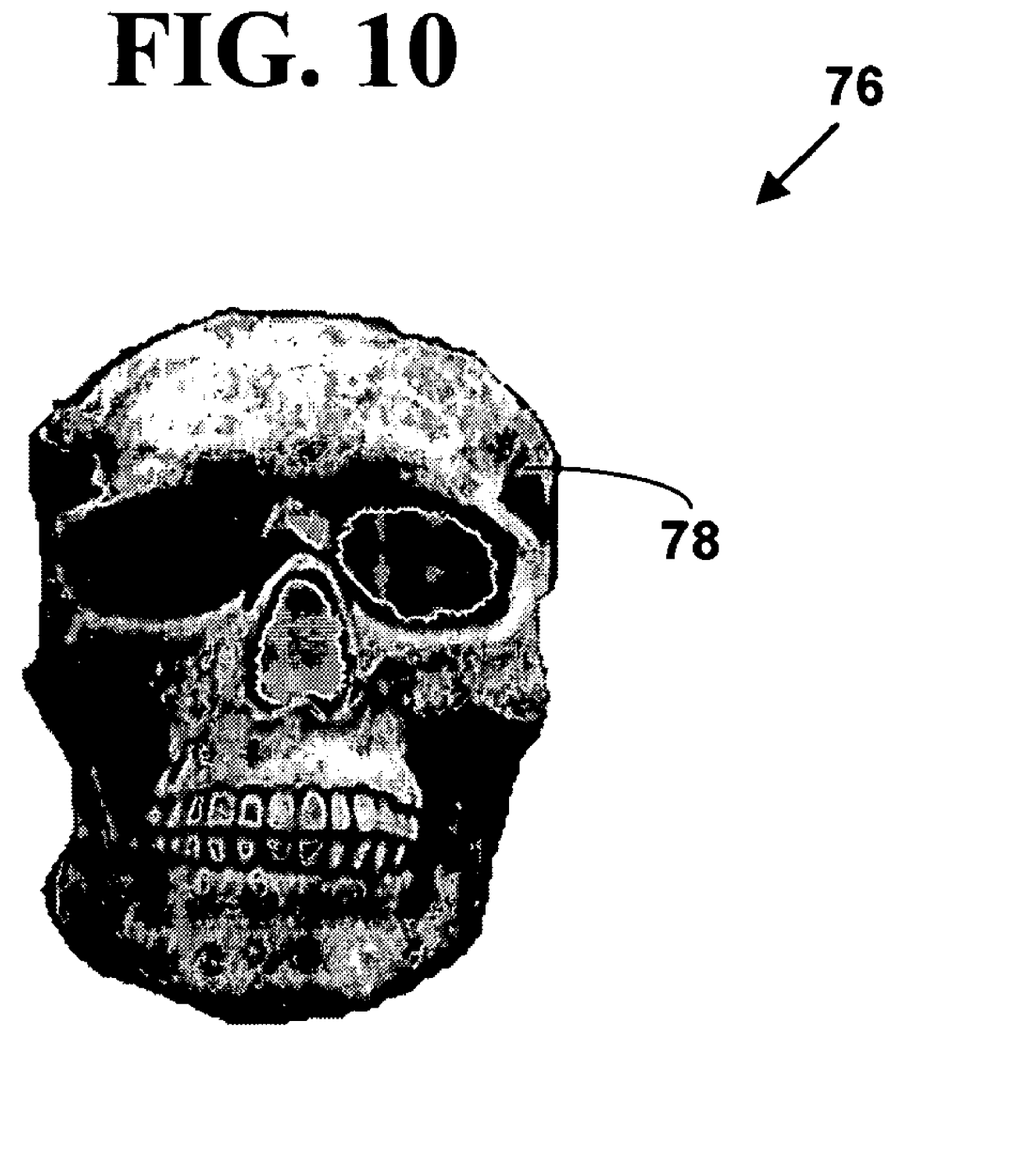
FIG. 10 is a block diagram illustrating another front view of a motorcycle display system made from an artificial crystal.

FIG. 10 is a block diagram illustrating another front view of a motorcycle display system 76 made from an artificial crystal. The artificial crystal 76 is etched with a laser to create a translucent shape 78 (e.g., in the form of a human skull, features of a human or animal body, features of a real or imaginary animals or characters, etc.) As was described above, the translucent shape 78 takes on a pre-determined color for a motorcycle system. In another embodiment, the translucent shape 78 and portions thereof (e.g., facial features of the skull, etc.) each display a different color for a selected motorcycle system.

In another embodiment, the artificial crystal includes Sphalerite, Eritrozincite, or Stilleit. In another embodiment, the artificial crystal includes acrylic plastic. In another embodiment, the artificial crystal includes a poly-silicon, plastic poly-resin, resin, or composite materials. In all these embodiments, the artificial crystal is transparent. In another embodiment, the artificial crystal is translucent. In another embodiment, the artificial crystal is opaque.

The translucent shape 78 takes on a color of any desired motorcycle system indicator and a turn signal indicator. For example, if a high beam was turned on, the artificial crystal 76 would turn a blue color. If a rider then activated the turn signal indicator, then the artificial crystal 76 would turn from the blue in color to an orange in color for the duration of the turn and then back to blue in color after the turn was completed. Other colors, changes of color and pre-determined priority orders can also be used to practice the invention.

The motorcycle display system 76 further includes a set of light emitting diodes (LEDs) includes the set of pre-determined colors and a set of display indicators on a bottom portion of the translucent shape 78 for displaying the information for the set of motorcycle systems in the plural of portions in the translucent shape or on the whole translucent shape.

In one embodiment, a first set of LEDs for the motorcycle display system 76 includes an orange colored LED for a turn signal indication, a red colored LED for a high-oil pressure indication and a blue colored LED for a high-beam indication and the first set of display indicators include a tachometer.

In one embodiment, a second set of LEDs for the motorcycle display system 76 includes an orange colored LED for a turn signal indication, a green colored LED for a neutral indication for a transmission and a yellow colored LED for a low fuel level or a voltage charging system indication and the second set of display indicators include a speedometer or an odometer.

In one embodiment, selected LEDs in the first and second set are dual-color LEDs that display a first color for a first indication for a motorcycle system and another different blinking color for a second indication for a motorcycle system.

It should be understood that the components, colors, priorities and programs, processes or methods described herein are exemplary only and more, fewer or other components and colors can be used to practice the invention. It should be understood that the components, colors, priorities and programs, processes or methods described herein are not related or limited to any particular type of components, colors, priorities and programs, processes or methods unless indicated otherwise.

In view of the wide variety of embodiments to which the principles of the present invention can be applied, it should be understood that the illustrated embodiments are exemplary only, and should not be taken as limiting the scope of the present invention. For example, more or fewer elements may be used in the block diagrams.

While various elements of the preferred embodiments have been described as being implemented with certain components and materials, in other embodiments other implementations and/or combinations or components and materials may alternatively be used, and vice-versa.

The claims should not be read as limited to the described order or elements unless stated to that effect. In addition, use of the term "means" in any claim is intended to invoke 35 U.S.C. §112, paragraph 6, and any claim without the word "means" is not so intended.

Therefore, all embodiments that come within the scope and spirit of the following claims and equivalents thereto are claimed as the invention.

I claim:

1. A motorcycle display viewing system, comprising in combination:
   a first component with a first set of a plurality of openings including a first set of light emitting diodes (LEDs) of a first set of pre-determined colors for a first set of display indicators for a first set of motorcycle systems, wherein the first set of light emitting diodes (LEDs) and the second set of LEDs are placed at an angle of 10 degrees to 80 degrees within the first set and second set of the plurality of openings for viewing in a variety of weather conditions; and
   a second component with a second set of a plurality of openings including a second set of LEDs of a second set of pre-determined colors for a second set of display indicators for a second set of motorcycle systems.

2. The motorcycle display viewing system of claim 1 wherein the first set of LEDs include an orange colored LED for a turn signal indication, a red colored LED for a high-oil pressure indication and a blue colored LED for a high-beam indication.

3. The motorcycle display viewing system of claim 1 wherein the second set of LEDs include an orange colored LED for a turn signal indication, a green colored LED for a neutral indication for a transmission and a yellow colored LED for a low fuel level or a voltage problem indication.

4. The motorcycle display viewing system of claim 1 wherein the first component and the second component include a human skull head.

5. The motorcycle display viewing system of claim 1 wherein the first set of plurality of openings is included in a front portion of the first component and the second set of plurality of openings is included in a front portion of the second component.

6. The motorcycle display viewing system of claim 1 wherein the first set of plurality of openings is included in a rear portion of the first component and the second set of plurality of openings is included in a rear portion of the second component.

7. The motorcycle display viewing system of claim 1 wherein the first component and the second component are mounted on handlebars of a motorcycle.

8. The motorcycle display viewing system of claim 1 wherein the first component includes a human skull head, a pig head, a wolf head, an eagle head, a human head, an animal head, a cartoon or fictional character head or other human or animal or fictional character body part.

9. A motorcycle display viewing system, comprising in combination:
   a center portion including a plurality of light emitting diodes (LEDs) of pre-determined colors and a plurality of display indicators for displaying information from a set of motorcycle systems;
   a front portion attached to the center portion including a material that is translucent when backlit and opaque when not backlit with a plurality of portions for displaying information for the set of motorcycle systems; and
   a back portion attached to the center portion and to the front portion including a plurality of openings including the plurality of LEDs and the plurality of display indicators displaying information for the set of motorcycle systems.

10. The motorcycle display viewing system of claim 9 wherein the front portion is used as a turn signal indicator, wherein, the material is backlit and is translucent when the turn signal indicator is active and the material is not backlit and is opaque when the turn signal indicator is not active.

11. The motorcycle display viewing system of claim 9 wherein the plurality of LEDs include an orange colored LED for a turn signal indication, a red colored LED for a high-oil pressure indication, a blinking red colored LED for a voltage, charging or electrical system malfunction, a purple colored LED for a normal voltage, charging or electrical system, a blue colored LED for a high-beam indication, a green colored LED for a neutral indication for a transmission or a yellow colored LED for a low fuel level or a voltage charging system indication.

12. The motorcycle display viewing system of claim 9 wherein the plurality of display indicators include a speedometer, odometer or tachometer.

13. The motorcycle display viewing system of claim 9 wherein the plurality of LEDs and plurality of display indicators are aligned with the plurality of portions of the front portion for displaying selected information for the set of motorcycle systems on the front portion via backlighting from the back portion.

14. The motorcycle display viewing system of claim 9 wherein the front portion includes a translucent plastic material.

15. A motorcycle display viewing system, comprising in combination:
   a first component with a first set of a plurality of openings including a first set of light emitting diodes (LEDs) of a first set of pre-determined colors for a first set of display indicators for a first set of motorcycle systems; and
   a second component with a second set of a plurality of openings including a second set of LEDs of a second set of pre-determined colors for a second set of display indicators for a second set of motorcycle systems, wherein the first component includes a human skull head, a pig head, a wolf head, an eagle head, a human head, an animal head, a cartoon or fictional character head or other human or animal or fictional character body part, and wherein the plurality of LEDs are printed on a circuit board and are powered and controlled by a computer chip or processor providing an automatic dimming feature for LEDs when external lighting becomes darker around the LEDs.

16. The motorcycle display viewing system of claim 9 wherein the plurality of LEDs are placed at an angle of 10 degrees to 80 degrees within the plurality of openings in the back portion for viewing in a variety of weather conditions.

17. The motorcycle display viewing system of claim 9 wherein the center portion is mounted on handlebars of a motorcycle.

18. The motorcycle display viewing system of claim 9 wherein the front portion is used as a turn signal indicator and is used to display a color of a selected motorcycle system based on a pre-determined priority scheme, wherein the front portion displays a color of a selected motorcycle system when the turn signal is not activated, displays a color of the turn signal indicator when activated and then returns to displaying the color of the selected motorcycle system when the turn signal is deactivated.

19. The motorcycle display viewing system of claim 9 wherein selected LEDs from the plurality of LEDs are dual-color LEDs that display a first color for a first indication of a motorcycle system and another different blinking color for a second indication for the motorcycle system.

20. A motorcycle viewing display system, comprising in combination:
    a component comprising an artificial crystal etched with a laser to create a translucent shape within the artificial crystal, wherein the translucent shape includes a plurality of portions for displaying information for a set of motorcycle systems with a pre-determined set of colors; and
    a set of light emitting diodes (LEDs) including the set of pre-determined colors and a set of display indicators included on a bottom portion of the component for displaying the information for the set of motorcycle systems in the plurality of portions in the translucent shape or on the whole translucent shape.

21. A motorcycle viewing display system, comprising in combination:
    a first component comprising an artificial crystal etched with a laser to create a translucent shape within the artificial crystal, wherein the translucent shape includes a plurality of portions for displaying information for a first set of motorcycle systems with a first set pre-determined set of colors and a first set of light emitting diodes (LEDs) including the first set of pre-determined colors and a first set of display indicators included on a bottom portion of the first component; and
    a second component comprising an artificial crystal etched with a laser to create a translucent shape within the artificial crystal, wherein the translucent shape includes a plurality of portions for displaying information for a second set of motorcycle systems with a second set pre-determined set of colors and a second set of light emitting diodes (LEDs) including the second set of pre-determined colors and a second set of display indicators included on a bottom portion of the first component.

22. The motorcycle display viewing system of claim 21 wherein the first set of LEDs include an orange colored LED for a turn signal indication, a red colored LED for a high-oil pressure indication and a blue colored LED for a high-beam indication and the first set of display indicators include a tachometer.

23. The motorcycle display viewing system of claim 21 wherein the second set of LEDs include an orange colored LED for a turn signal indication, a green colored LED for a neutral indication for a transmission and a yellow colored LED for a low fuel level or a voltage charging system indication and the second set of display indicators includes speedometer or an odometer.

24. The motorcycle display viewing system of claim 21 wherein the first component and the second component are mounted on handlebars of a motorcycle.

* * * * *